United States Patent
Oshima (10) Patent No.: US 6,853,463 B2
(45) Date of Patent: *Feb. 8, 2005

(54) IMAGE FORMING APPARATUS FOR PERMITTING IMAGE FORMATION IN ACCORDANCE WITH IMAGE ATTRIBUTE, AND CONTROL METHOD THEREFOR

(75) Inventor: Keita Oshima, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/447,307

(22) Filed: Nov. 23, 1999

(65) Prior Publication Data

US 2003/0197876 A1 Oct. 23, 2003

(30) Foreign Application Priority Data

Nov. 30, 1998 (JP) .......................................... 10-339877

(51) Int. Cl.$^7$ ................................................ G06K 15/00
(52) U.S. Cl. ........................................ 358/1.9; 358/1.4
(58) Field of Search .......................... 358/1.1, 1.2, 1.9, 358/1.13, 1.14, 1.18; 705/54; 713/182, 189, 193, 194, 200; 380/52, 57, 59

(56) References Cited

U.S. PATENT DOCUMENTS 5,636,032 A * 6/1997 Springett ..................... 358/296
5,933,498 A * 8/1999 Schneck et al. .............. 705/54

* cited by examiner

*Primary Examiner*—Arthur G. Evans
(74) *Attorney, Agent, or Firm*—Fitzpatrick, Cella, Harper & Scinto (57) ABSTRACT

Permission determination of image formation is done using different criteria in accordance with the checked quality and attributes of an image to be formed. For example, whether to permit image formation is determined using different criteria between the case of forming an image to be charged or image which must be formed with high quality, and the case of forming another image. In addition, display corresponding to the attributes of an image to be formed and the state of an image forming apparatus is performed.

20 Claims, 5 Drawing Sheets

| FIG. 3A | FIG. 3B |

FIG. 3A

IMAGE FORMING APPARATUS FOR PERMITTING IMAGE FORMATION IN ACCORDANCE WITH IMAGE ATTRIBUTE, AND CONTROL METHOD THEREFOR

BACKGROUND OF THE INVENTION

1. Field of the Invention

The present invention relates to an image forming apparatus, a control method therefor, and a storage medium, and, more particularly, to an image forming apparatus for permitting image formation in accordance with image attributes and the like, a control method therefor, and a storage medium.

2. Related Background Art

As computer networks are becoming popular, high-quality image information can be obtained via the networks. This poses social problems such as protection of the copyright on image information.

To solve such problems, a transmitting source transmits image information including charging information to a user, or a user sends back charging information to the transmitting source in accordance with the use frequency of image information. Image information including charging information can only be printed by dedicated software or a dedicated printer, and is protected from being illegally copied. That is, the user can print only a predetermined number of images permitted in accordance with a charge, and is inhibited from printing more than the predetermined number of images from the original data.

When only a predetermined number of images can be printed, as described above, an image forming apparatus must reliably output them. Particularly for a color image, the image forming apparatus must output the highest-quality image regarding the image quality such as the density and tint.

Generally, to maintain high image quality, internal states such as the remaining amount of developing agent and the remaining life of an exchangeable component that may influence images must be guaranteed satisfactorily normal. In normal use, however, these strict requirements degrade the usability. For example, even if the remaining toner is little, images can be printed with quality to a certain degree (so as to discriminate the images). In general, this state is called a warning state in which control for limiting print action is not performed. In this case, the image quality maintenance conditions are always checked. If any condition is satisfied during continuous print, print action stops.

In this manner, when only a limited number of images can be printed, and print action stops during the operation owing to functional deterioration in internal states which may influence images, the user usability greatly degrades.

SUMMARY OF THE INVENTION

It is an object of the present invention to change a criterion used for permission determination of image formation in accordance with the attributes of an image to be formed.

For example, in a print mode required to reliably print an image with high quality, the print is inhibited even when a warning message is displayed but print action continues in a normal print mode. This can suppress degradation in usability even in normal printer use, while coping with a print mode in which print is charged every page.

It is another object of the present invention to perform permission determination of image formation and display corresponding to the attributes of an image to be formed and the apparatus state.

The above and other objects of the present invention will be apparent from the following description in conjunction with the accompanying drawings.

BRIEF DESCRIPTION OF THE DRAWINGS

FIG. 2, which is comprised of FIGS. 2A and 2B, is a flow chart showing the operation of the image forming apparatus in the first embodiment.

DETAILED DESCRIPTION OF THE PREFERRED EMBODIMENTS

Several preferred embodiments of the present invention will be described in detail below with reference to the accompanying drawings.

First Embodiment

Figure 1:
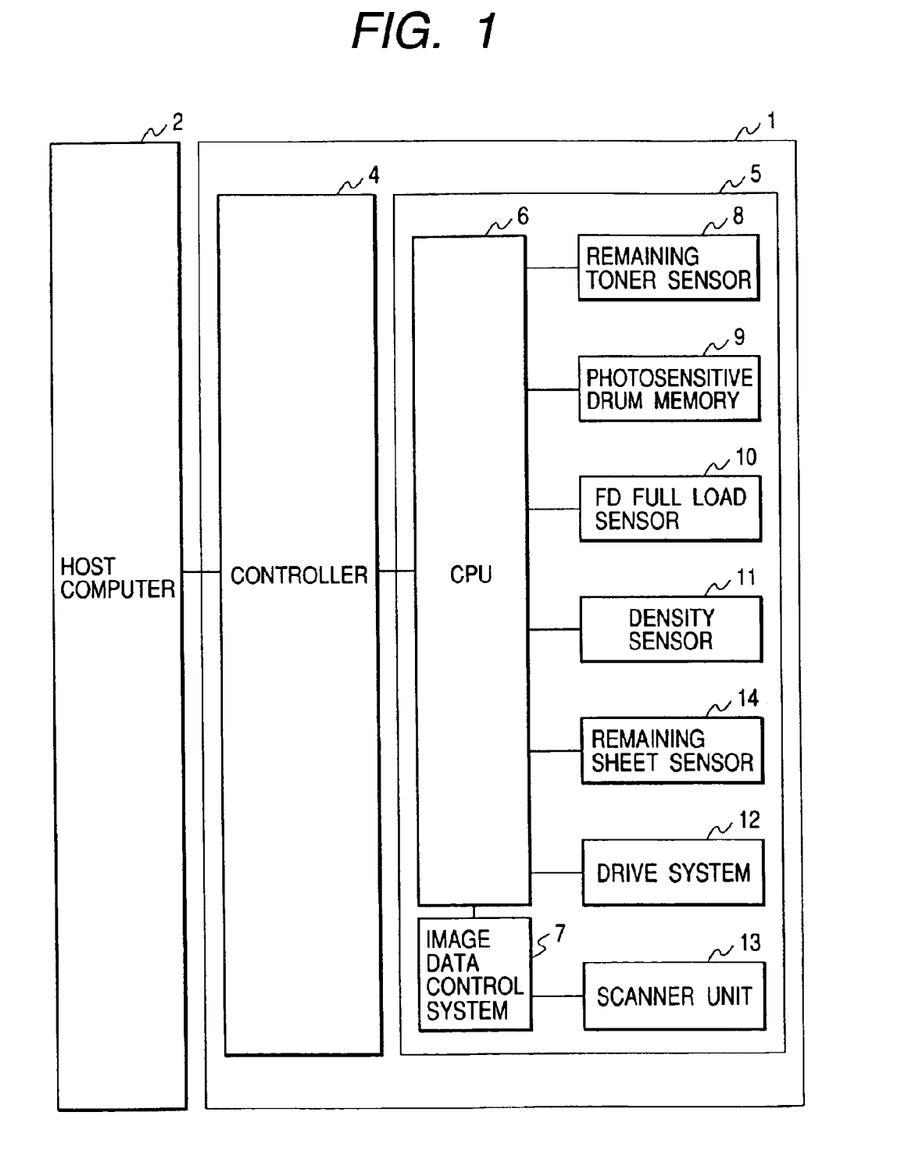
FIG. 1 is a block diagram showing the schematic arrangement of an image forming apparatus according to the present invention.

FIG. 1 is a block diagram showing the schematic arrangement of a color laser printer according to the first embodiment.

In FIG. 1, a color laser printer 1 is connected to a host computer 2. The color laser printer 1 comprises a controller 4 and printer engine 5. The printer engine 5 comprises a CPU 6, an image data control system 7, a remaining toner sensor 8, a photosensitive drum memory 9, an FD (Face-Down) full load sensor 10, a density sensor 11, a drive system 12, a scanner unit 13, and a remaining sheet sensor 14. The image data control system 7, remaining toner sensor 8, photosensitive drum memory 9, FD full load sensor 10, density sensor 11, and remaining sheet sensor 14 are sensing means for sensing internal states which may influence images.

Note that the color laser printer 1 and host computer 2 may be connected through an SCSI cable or an RS-232C cable or through a network.

The operation of the color laser printer 1 will be explained.

The host computer 2 instructs the color laser printer 1 to print data including image data in order to print an image. The controller 4 is an interface between the host computer 2 and printer engine 5. The controller 4 maps image information from the host computer 2 into video data capable of forming an image, sends the video data to the image data control system 7, and instructs the CPU 6 to execute various control operations for image formation. The CPU 6 forms an image by controlling the drive system 12 and image data control system 7 in accordance with the instruction from the controller 4. The CPU 6 checks the state of the printer engine 5 from information from various sensors, and informs the controller 4 of the checked state.

The self-test operations of respective internal states based on sensing results by the respective sensing means will be described.

[Remaining Toner]

The first embodiment adopts an optical means for sensing the remaining toner. The remaining toner is determined by the transmission quantity and time of light transmitted through the toner vessel. The remaining toner sensor 8 includes this mechanism, and sends back remaining toner information to the CPU 6. From this information, the CPU 6 can determine the degree of influence of the remaining toner on the image quality.

The remaining toner determination sequence and mechanical mechanism can be realized by known techniques, and a detailed description thereof will be omitted.

[Service Life of Photosensitive Drum]

In the first embodiment, a nonvolatile memory such as an EEPROM as the photosensitive drum memory 9 is mounted in a photosensitive drum unit in order to check the service life of the photosensitive drum, and holds the use history. The photosensitive drum memory 9 is accessed by the CPU 6, and the storage contents are updated in accordance with the use time of the photosensitive drum.

The CPU 6 checks the service life of the photosensitive drum on the basis of the contents of the photosensitive drum memory 9, and determines the degree of influence on the image quality.

The means for mounting the photosensitive drum memory 9, and the use history update means for calculating the service life of the photosensitive drum can be realized by known techniques, and a detailed description thereof will be omitted.

[FD Full Load Sensing]

The color laser printer 1 in the first embodiment is equipped with a face-down delivery tray, and comprises a face-down full load sensing means. If a predetermined number of sheets or more are stacked on the face-down delivery tray, sheets readily jam. To prevent this, the FD full load sensor 10 checks the full load of the tray.

The face-down full load sensing means can be realized by known techniques, and a detailed description thereof will be omitted.

[Density Control]

In density control of the first embodiment, a solid image of an area corresponding to the reflection density which can be sensed by the density sensor 11 is formed by the same process as image formation, and the reflection density is sensed by the density sensor 11. The density sensed by the density sensor 11 is fed back to image formation process conditions by the CPU 6.

When the CPU 6 cannot entirely feed back the density to image formation process conditions from the sensed value of the density sensor 11, the CPU 6 displays a warning message that high-quality image formation cannot be guaranteed. Also when the sensed value of the density sensor 11 represents an abnormal density, the CPU 6 displays a warning message that high-quality image formation cannot be guaranteed, as density sensor abnormality sensing.

The density control means can be realized by known techniques, and a detailed description thereof will be omitted.

[Remaining Sheet Sensing]

The color laser printer in the first embodiment comprises a means for sensing remaining sheets at each feed port. The remaining sheet sensing means can sense the presence/absence of sheets at the feed port, and when sheets are present, the number of remaining sheets.

The remaining sheet sensing means can be realized by known techniques, and a detailed description thereof will be omitted.

A control instruction (print mode) by the host computer 2 will be explained.

In instructing the color laser printer 1 to print information, the host computer 2 adds, to print instruction information, information about whether the print requests normal print or reliable high-quality print. For example, to print image information to be charged that is obtained through the network, the information must be reliably printed with high quality. In this case, the host computer 2 transmits information requesting high-quality print together with a print instruction to the color laser printer 1. The CPU 6 of the color laser printer 1 obtains through the controller 4 the information requesting high-quality print together with the print instruction. If reliable high-quality print is requested (high quality request is instructed), the CPU 6 inhibits print action even in a situation in which a warning message is displayed but print action continues in normal print.

As internal states in such situation, the first embodiment will exemplify little remaining toner, the end of life of the photosensitive drum, FD full load, density sensor abnormality sensing, and image quality out of guarantee under density control.

An internal state control method will be described with reference to a flow chart.

Figures 2, 2A:
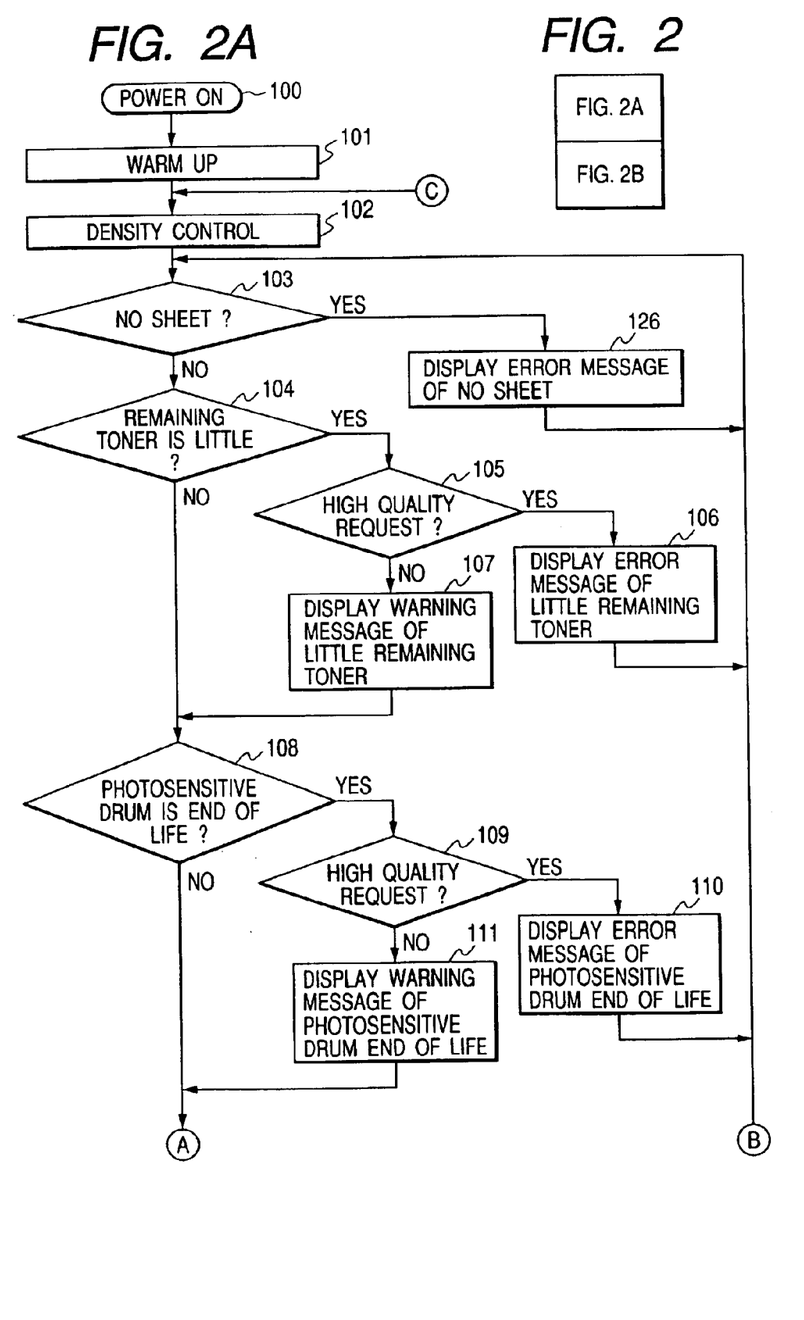
Figure 2B:
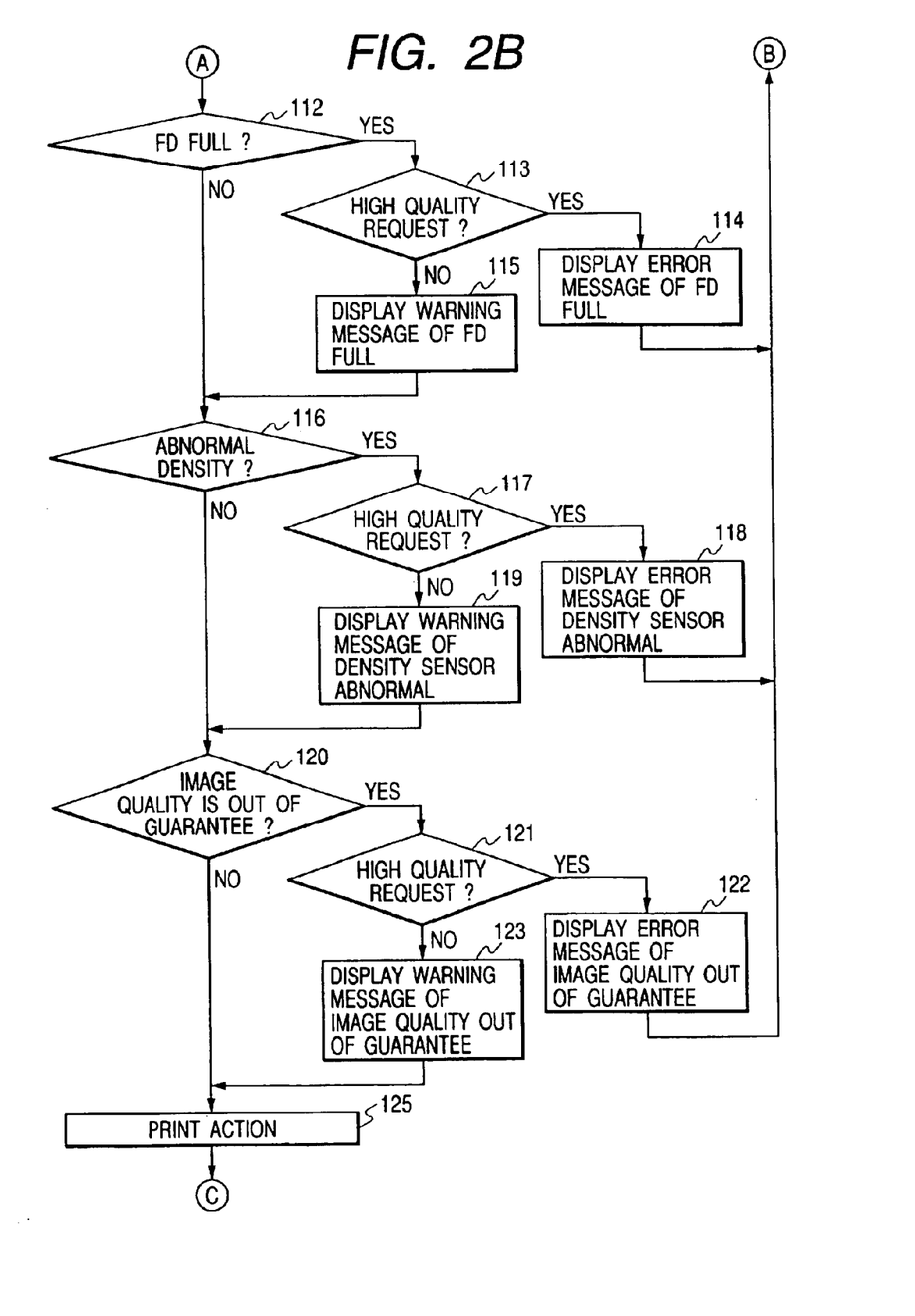

FIGS. 2A and 2B are flow charts showing the control of the printer engine 5 of the color laser printer 1 in the first embodiment. Note that each step surrounded by a rectangular frame in FIGS. 2A and 2B represents a function of the CPU 6. In the color laser printer 1, the controller 4 and engine 5 operate parallel. The printer engine 5 starts print control in accordance with a print instruction from the controller 4.

A high quality request shown in FIGS. 2A and 2B is set or canceled by the controller 4 asynchronously from the flow chart in FIGS. 2A and 2B.

In FIG. 2A, if the color laser printer 1 is powered on (step 100; each step will be simply referred to as 100 or the like), the CPU 6 initializes the drive system and image data control system (101).

The CPU 6 performs density control (102), and determines process conditions for stabilizing the image quality. At this time, the CPU 6 detects a density abnormality from the density sensor used in density control, and an abnormality which inhibits the image quality from being stabilized by process conditions.

After density control, the CPU 6 waits for a print instruction from the controller 4. When the host computer 2 instructs print and transmits an image to be printed, the controller 4 instructs the CPU 6 to print the image. Before print, the CPU 6 checks printable conditions.

The CPU 6 first checks the absence of sheets (103). If YES in 103, the CPU 6 does not print the image, displays an error message of no sheet (126), and waits until the tray is replenished with sheets.

If NO in 103, the CPU 6 checks whether the remaining toner is little (checks whether the remaining toner is at least at the first level enough to form a high-quality image) (104). If the remaining toner is sufficient at the first level or higher, the CPU 6 advances to 108. If the remaining toner is insufficient for forming a high-quality image at less than the first level, the CPU 6 checks whether a high quality request is instructed (105). If NO in 105, no high-quality image can be formed, but the color laser printer 1 can be normally used without any problem. Thus, the CPU 6 displays a warning message (107), and shifts to 108. Note that when the remaining toner is at less than a level at which even normal use fails, the CPU 6 displays an error message so as not to print the image. When the remaining toner is at less than the first level, and a high quality request is instructed, the CPU 6 displays an error message that image formation is impossible (106), and returns to 103 to wait until the high quality request is canceled or the developing unit is replenished with the toner.

The CPU 6 checks whether the photosensitive drum is at the end of life (108). If the photosensitive drum is new, the CPU 6 advances to 112. If the photosensitive drum is too old to form a high-quality image, the CPU 6 checks whether a high quality request is instructed (109). If NO in 109, no high-quality image can be formed, but the color laser printer 1 can be normally used without any problem. Thus, the CPU 6 displays a warning message (111), and shifts to 112. Note that when the photosensitive drum is too old to normally use, the CPU 6 displays an error message so as not to print the image. When the photosensitive drum is too old to print a high-quality image, and a high quality request is instructed, the CPU 6 displays an error message that image formation is impossible (110), and returns to 103 to wait until the high quality request is canceled or the photosensitive drum is replaced with a new one.

The CPU 6 checks whether the face-down tray is full (112). If NO in 112, the CPU 6 shifts to 116. If YES in 112, the CPU 6 checks whether a high quality request is instructed (113). If NO in 113, no high-quality image can be formed owing to a jam, but the color laser printer 1 can be normally used without any problem. Thus, the CPU 6 displays a warning message (115), and shifts to 116.

If YES in 113, the CPU 6 displays an error message that image formation is impossible (114), and returns to 103 to wait until the high quality request is canceled or sheets are removed.

The CPU 6 checks whether the density sensor senses an abnormal density (116). If NO in 116, the CPU 6 shifts to 120. If YES in 116, the CPU 6 checks whether a high quality request is instructed (117). If NO in 117, process conditions for stabilizing the image quality may be improper, but the color laser printer 1 can be normally used without any problem. Thus, the CPU 6 displays a warning message (119), and shifts to 120. If YES in 117, the CPU 6 displays an error message that image formation is impossible (118), and returns to 103 to wait until the high quality request is canceled.

The CPU 6 checks whether process conditions for stabilizing the image quality are properly determined (120). If NO in 120, the CPU 6 advances to 125. If the results of density control represent that print is possible but the image quality cannot be guaranteed (YES in 120), the CPU 6 checks whether a high quality request is instructed (121).

If NO in 121, no high-quality print can be guaranteed, but the color laser printer 1 can be normally used without any problem. Thus, the CPU 6 displays a warning message (123), and shifts to 125. If YES in 121, the CPU 6 displays an error message that image formation is impossible (122), and returns to 103 to wait until the high quality request is canceled.

The CPU 6 performs print action in accordance with a print instruction from the controller 4 (125).

According to the first embodiment, when the controller 4 instructs high-quality print, the CPU 6 displays an error message and inhibits print action even in a situation in which a warning message is displayed but print action continues in normal print. This makes it possible to reliably form a high-quality image when high-quality print is instructed.

For example, to reliably output a charged image with high quality, the host computer 2 informs the color laser printer 1 of this, and transmits image data, thereby outputting a high-quality image. In normal print, print can be done without degrading the usability unless high-quality print is instructed.

In the first embodiment, print quality warning information includes little remaining toner, the end of life of the photosensitive drum, FD full load, density sensor abnormality sensing, and image quality out of guarantee. However, the present invention is not limited to this, and the same effects can be attained even using the ends of life of other expendables influencing the print quality, and image quality control conditions.

As for the method of realizing each sensing means, another method may be used. For example, the first embodiment updates data in the nonvolatile memory in order to check the service life of the photosensitive drum. However, the present invention may check the service life using another means.

In the above description, warning and error messages are displayed at the printer 1. Alternatively, warning and error messages may be displayed at the printer 1, and at the same time, information about the warning and error messages may be transmitted to the host computer 2 which instructed print, and the warning and error messages may also be displayed at the host computer 2.

In the above description, various checks are done to display warning and error messages after the host computer instructs print. Instead, these checks may be done in advance, and the printer state (e.g., normal print is possible but high-quality print is impossible, or both normal print and high-quality print are possible) may be informed in accordance with an inquiry from the host computer.

Second Embodiment

The second embodiment has the same basic arrangement as that of the first embodiment. The difference in internal state control method from the first embodiment will be mainly described.

Figure 3:
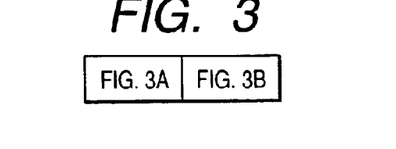
FIG. 3, which is comprised of FIGS. 3A and 3B, is a flow chart showing the operation of an image forming apparatus in the second embodiment.
Figure 3A:
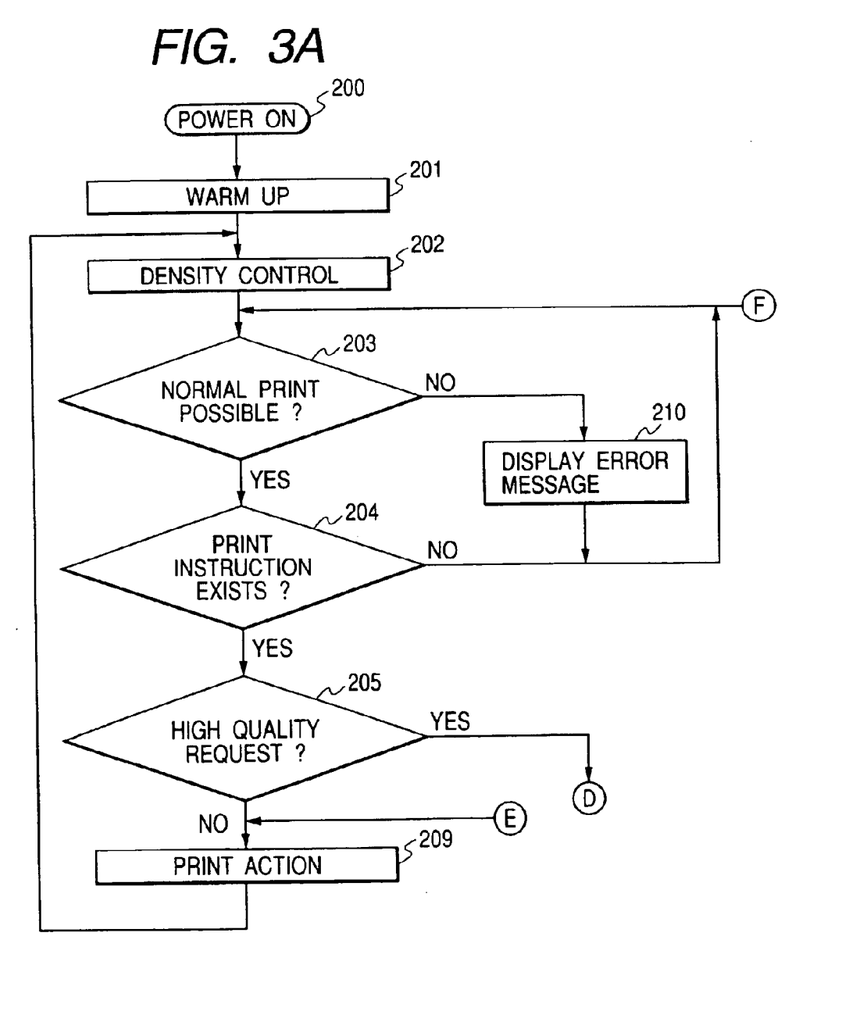
Figure 3B:
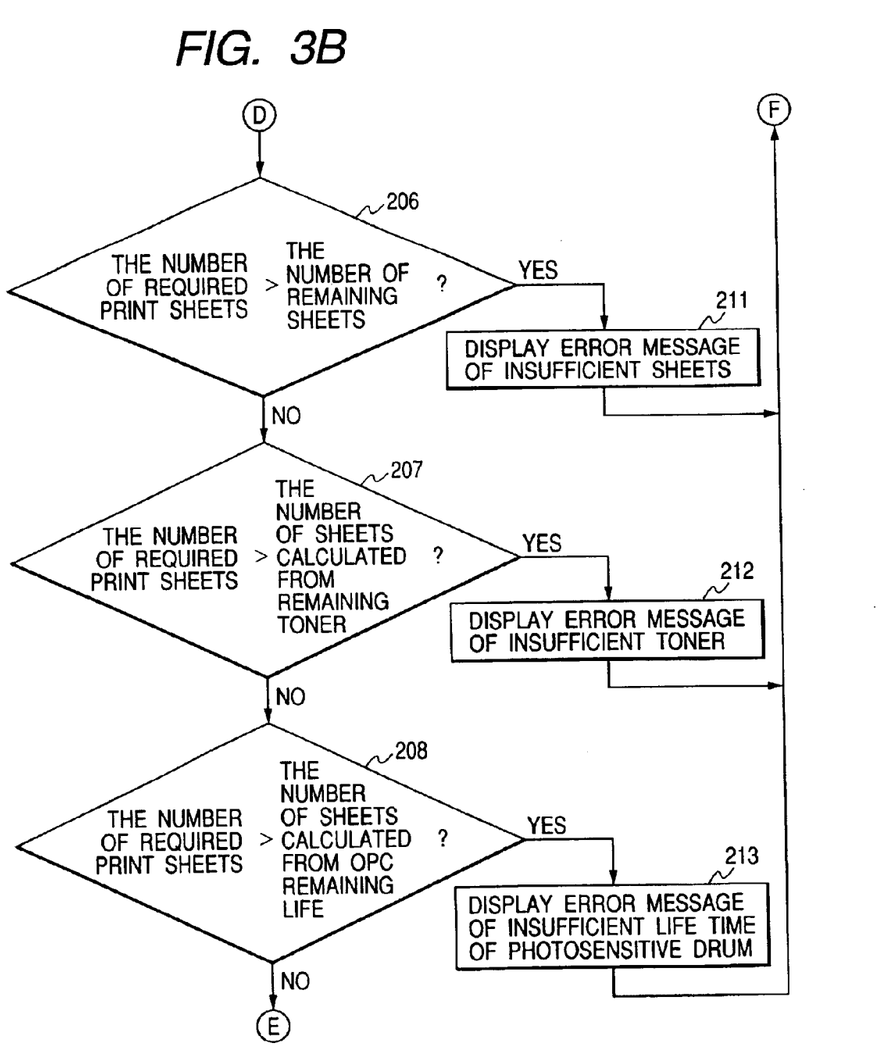

FIGS. 3A and 3B are flow charts showing an internal state control method according to the second embodiment. Similar to FIGS. 2A and 2B, each step surrounded by a rectangular frame in FIGS. 3A and 3B represents a function of a CPU 6.

In FIG. 3A, if a color laser printer 1 is powered on (200), the CPU 6 initializes the drive system and image data control system (201).

The CPU 6 performs density control (202), and determines process conditions for stabilizing the image quality. At this time, the CPU 6 detects a density abnormality from a density sensor used in density control, and an abnormality which inhibits the image quality from being stabilized by process conditions.

After density control, the CPU 6 waits for a print instruction from a controller 4. Before this, the CPU 6 checks printable conditions (203). If the print is not a high-quality print but is impossible owing to the absence of sheets or expandable abnormality, the CPU 6 displays an error message (210), and loops in 203 until the print impossible condition is canceled. If YES in 203, the CPU 6 shifts to 204. Note that printable conditions checked in 203 include conditions corresponding to the checks in the first embodiment.

The CPU 6 waits for a print instruction from the controller 4 (204). If NO in 204, the CPU 6 returns to 203; if YES, the CPU 6 advances to 205.

The CPU 6 checks whether the print instruction from the controller 4 includes a high quality request. If NO in 205, the CPU 6 advances to 209; if YES, to 206. In 206, the CPU 6 checks whether the number of instructed print sheets satisfies corresponding conditions.

In 206, the CPU 6 checks whether the number of remaining sheets is equal to or larger than the number of required print sheets. If YES in 206, the CPU 6 displays an error message of insufficient sheets (211), and returns to 203. If NO in 206, the CPU 6 shifts to 207. In this case, the CPU 6 calculates the number of remaining sheets corresponding to the number of pages considering double-sided print.

In 207, the CPU 6 checks whether the remaining toner cannot print the number of required print sheets with high quality. If YES in 207, the CPU 6 displays an error message of insufficient toner (212), and returns to 203. If NO in 207, the CPU 6 advances to 208.

In 208, the CPU 6 checks from the remaining life of the photosensitive drum whether the number of required print sheets cannot be printed with high quality. If YES in 208, the CPU 6 displays an error message that the number of required print sheets cannot be printed with high quality owing to the remaining life of the photosensitive drum (213), and returns to 203. If NO in 208, the CPU 6 advances to 209.

In 209, the CPU 6 prints the number of required print sheets.

According to the second embodiment, the number of high-quality printable pages is checked in advance in consideration of the number of sheets to be printed with high quality. This makes it possible to reliably print a desired number of pages with high quality.

In the second embodiment, the number of required print sheets is obtained from the controller 4 to check the number of sheets to be printed by a printer engine 5. Alternatively, the controller 4 may be informed of the state of the printer engine 5 to confirm the number of printable pages by the controller 4. This control may be executed by a host computer 2.

Also in the second embodiment, an error message is displayed at the printer. Instead, similar to the first embodiment, the host computer may be informed of an error message, and the host computer may display the error message.

Third Embodiment

The third embodiment has the same basic arrangement and control contents as those of the first or second embodiment. The difference from the first embodiment will be mainly described.

In the first and second embodiments, the printer engine 5 (CPU 6) determines whether high-quality print is possible/impossible. In the third embodiment, a controller 4 performs this determination.

For this purpose, information for determining whether high-quality print is possible/impossible is transmitted from the printer engine 5 to the controller 4, in place of transmitting a high-quality print request from the controller 4 to the printer engine 5 in the first and second embodiments.

The controller 4 determines based on this information whether high-quality print is possible, and controls whether to instruct the printer engine 5 to print information.

According to the third embodiment, the controller 4 determines whether high-quality print is possible. This makes it possible to manufacture a printer capable of performing high-quality print even using the printer engine 5 not corresponding to high-quality print.

Note that each embodiment has exemplified the printer, and particularly the color laser printer 1. However, the present invention is not limited to this, and can also be applied to another type of printer such as an ink-jet printer. Further, the present invention is not limited to the printer, and can also be applied to another image forming means such as a display.

The present invention includes program codes themselves for operating various devices and a means for supplying the program codes to a computer so as to realize the functions of the image forming apparatus described in each of the first to third embodiments, and program codes of steps for realizing the image forming method and a means for supplying the program codes to the computer. An example of these means is a storage medium storing the program codes.

In this case, a predetermined reproduction device reads out the program codes stored in the storage medium to operate an EEPROM. As the storage medium for storing the program codes, a floppy disk, a hard disk, an optical disk, a magnetooptical disk, a CD-ROM, a magnetic tape, a nonvolatile memory card, and a ROM are available.

The functions of each embodiment are realized not only by executing the supplied program codes supplied by the computer, but also by the program codes in cooperation with an OS (Operating System) or another application software running on the computer. These program codes are incorporated in the present invention.

The functions of each embodiment are also realized when the supplied program codes are stored in the memory of a function expansion board in the computer or a function expansion unit connected to the computer, and the CPU of the function expansion board or function expansion unit performs part or all of actual processing on the basis of the instructions of the program codes. This system is also incorporated in the present invention.

The present invention can change conditions used for permission determination of image formation in accordance with the attributes of an image to be formed. For example, in a print mode required to reliably print an image with high quality, the print is inhibited even when a warning message is displayed but print action continues in a normal print mode. This can suppress degradation in usability even in normal printer use, while meeting a print mode in which print is charged every page.

In addition, the present invention can perform permission determination of image formation and display corresponding to image attributes and apparatus state.

What is claimed is:

1. An image forming apparatus comprising:
   first check means for checking quality of an image to be formed;
   second check means for checking a status of said image forming apparatus using different criteria in accordance with a check by said first check means; and
   determination means for performing permission determination of image formation in accordance with a check by said second check means.

2. An apparatus according to claim 1, wherein said first check means checks whether to form a high-quality image.

3. An apparatus according to claim 1, wherein said second check means checks a state of said image forming apparatus which may influence image formation.

4. An apparatus according to claim 1, wherein said second check means checks the status of said image forming apparatus using different criteria for at least one item of remaining toner for forming an image, service life of a photosensitive drum for forming an image, whether a tray for outputting an image formed on a sheet is full, a predicted density value of an image to be formed, and remaining sheets for forming an image.

5. An apparatus according to claim 1, wherein said determination means determines whether to permit or inhibit image formation.

6. An apparatus according to claim 1, further comprising display means for performing display output based on the determination by said determination means.

7. An image forming apparatus comprising:
reception means for receiving an image;
first check means for checking an attribute of a received image;
second check means for checking a status of said image forming apparatus using different criteria in accordance with a check by said first check means; and
determination means for performing permission determination of image formation in accordance with a check by said second check means.

8. An apparatus according to claim 7, wherein said first check means checks whether the received image is an image to be charged.

9. An apparatus according to claim 7, wherein said first check means checks whether the received image is an image requiring high-quality image formation.

10. An apparatus according to claim 7, wherein said second check means checks a state of said image forming apparatus which may influence image formation.

11. An apparatus according to claim 7, wherein said second check means checks the status of said image forming apparatus using different criteria for at least one item of remaining toner for forming an image, service life of a photosensitive drum for forming an image, whether a tray for outputting an image formed on a sheet is full, a predicted density value of an image to be formed, and remaining sheets for forming an image.

12. An apparatus according to claim 7, further comprising display means for performing display output based on the determination by said determination means.

13. An apparatus according to claim 12, wherein said display means causes a device which transmitted the received image to perform the display.

14. An image forming apparatus comprising:
check means for checking an attribute of an image to be formed;
identification means for identifying a state of said image forming apparatus which may influence image formation, using different criteria in accordance with a check by said check means; and
control means for selectively performing, in accordance with identification by said identification means, an operation of performing a warning about image formation and accepting an image formation request, an operation of accepting an image formation request without performing a warning about the image formation, and an operation of not accepting an image formation request.

15. A method of controlling an image forming apparatus, comprising:
a first check step of checking quality of an image to be formed;
a second check step of checking a status of the image forming apparatus; and
a determination step of performing permission determination of image formation in accordance with whether the status of the image forming apparatus in said second check step is a predetermined status and whether the quality of an image in said first check step is a predetermined quality.

16. A method of controlling an image forming apparatus, comprising:
a reception step of receiving an image;
a first check step of checking an attribute of a received image;
a second check step of checking a status of the image forming apparatus; and
a determination step of performing permission determination of image formation in accordance with whether the status of the image forming apparatus in said second step is a predetermined status and whether the attribute of the received image in said first check step is a predetermined attribute.

17. A method of controlling an image forming apparatus, comprising:
a check step of checking an attribute of an image to be formed;
an identification step of identifying a state of the image forming apparatus which may influence image formation, using different criteria in accordance with a check in said check step; and
a control step of selectively performing, in accordance with an identification in said identification step, an operation of performing a warning about image formation and accepting an image formation request, an operation of accepting an image formation request without performing a warning about the image formation, and an operation of not accepting an image formation request.

18. A storage medium which stores a program for controlling an image forming apparatus, the program comprising program code for executing:
a first a check step of checking quality of an image to be formed;
a second check step of checking status of the image forming apparatus using different criteria in accordance with a check in said first check step; and
a determination step of performing permission determination of image formation in accordance with a check in said second check step.

19. A storage medium which stores a program for controlling an image forming apparatus, the program comprising program code for executing:
a reception step of receiving an image;
a first check step of checking an attribute of a received image;
a second check step of checking a status of the image forming apparatus using different criteria in accordance with a check in said first check step; and
a determination step of performing permission determination of image formation in accordance with a check in said second check step.

20. A storage medium which stores a program for controlling an image forming apparatus, the program comprising program code for executing:
a check step of checking an attribute of an image to be formed;
an identification step of identifying a state of the image forming apparatus which may influence image formation, using different criteria in accordance with a check in said check step; and
a control step of selectively performing, in accordance with an identification in said identification step, an operation of performing a warning about image formation and accepting an image formation request, an operation of accepting an image formation request without performing a warning about the image formation, and an operation of not accepting an image formation request.

* * * * *

UNITED STATES PATENT AND TRADEMARK OFFICE
CERTIFICATE OF CORRECTION

PATENT NO.    : 6,853,463 B2
DATED         : February 8, 2005
INVENTOR(S)   : Keita Oshima It is certified that error appears in the above-identified patent and that said Letters Patent is hereby corrected as shown below:

Drawings,
Sheet 2, Figure 2A, "END" (all occurrences) should read -- AT END --.

Column 4,
Line 25, "parallel." should read -- in parallel --.
Line 45, "checks" should read -- checks for --.

Column 5,
Line 9, "normally use," should read -- use normally, --.

Column 8,
Line 13, "magnetooptical" should read -- magneto-optical --.

Column 10,
Line 28, "a first a check step" should read -- a first check step --.

Signed and Sealed this

Seventh Day of June, 2005

JON W. DUDAS
*Director of the United States Patent and Trademark Office*